United States Patent
Mashino et al.

(10) Patent No.: US 8,594,255 B2
(45) Date of Patent: Nov. 26, 2013

(54) RECEPTION DEVICE AND RECEPTION METHOD

(75) Inventors: Jun Mashino, Yokosuka (JP); Takatoshi Sugiyama, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 252 days.

(21) Appl. No.: 13/003,810

(22) PCT Filed: Jul. 23, 2009

(86) PCT No.: PCT/JP2009/063223
§ 371 (c)(1),
(2), (4) Date: Jan. 12, 2011

(87) PCT Pub. No.: WO2010/010936
PCT Pub. Date: Jan. 28, 2010

(65) Prior Publication Data
US 2011/0129047 A1  Jun. 2, 2011

(30) Foreign Application Priority Data
Jul. 25, 2008  (JP) ................................ 2008-192465

(51) Int. Cl.
*H03D 1/04*  (2006.01)

(52) U.S. Cl.
USPC ............................. 375/346; 375/316; 327/310

(58) Field of Classification Search
USPC ........................................................ 375/246
See application file for complete search history.

(56) References Cited

U.S. PATENT DOCUMENTS

| | | | | |
|---|---|---|---|---|
| 4,736,455 A | * | 4/1988 | Matsue et al. | 455/138 |
| 5,162,805 A | * | 11/1992 | Cantrell | 342/379 |
| 2003/0185147 A1 | * | 10/2003 | Taga et al. | 370/210 |
| 2007/0009011 A1 | * | 1/2007 | Coulson | 375/144 |
| 2008/0143580 A1 | * | 6/2008 | Glazko et al. | 342/17 |
| 2008/0192844 A1 | * | 8/2008 | Yamagata et al. | 375/260 |
| 2008/0279287 A1 | * | 11/2008 | Asahina | 375/242 |
| 2010/0014616 A1 | * | 1/2010 | Coulson | 375/341 |
| 2011/0249569 A1 | * | 10/2011 | Mashino et al. | 370/242 |

FOREIGN PATENT DOCUMENTS

| CN | 1731778 A | 2/2006 |
|---|---|---|
| EP | 0 371 433 A2 | 6/1990 |
| EP | 1 983 673 A1 | 10/2008 |

(Continued)

OTHER PUBLICATIONS

Notice of Reasons for Rejection for Japanese Patent Application No. 2008-192465 mailed May 8, 2012.

(Continued)

*Primary Examiner* — Chieh M Fan
*Assistant Examiner* — Santiago Garcia
(74) *Attorney, Agent, or Firm* — Harness, Dickey & Pierce, P.L.C.

(57) ABSTRACT

It is possible to reduce the effect of an interference signal while suppressing increases in a circuit scale and a processing time. A reception device receives a multicarrier signal and an interference signal via a radio transmission path, detects a frequency position of the interference signal, performs filtering to suppress the multicarrier signal and the interference signal at the detected frequency position of the interference signal, removes a guard interval from the multicarrier signal suppressed by the filtering, demodulates each subcarrier of the multicarrier signal from which the guard interval is removed, and performs error correction on the demodulated signal.

2 Claims, 11 Drawing Sheets

(56) References Cited

FOREIGN PATENT DOCUMENTS

| JP | 04-360441 A | 12/1992 |
|---|---|---|
| JP | 07-336248 A | 12/1995 |
| JP | 2000-134174 A | 5/2000 |
| JP | 2007-243662 A | 9/2007 |
| KR | 10-2008-0036234 A | 4/2008 |
| WO | 2007/091562 A1 | 8/2007 |
| WO | 2007/099413 A1 | 9/2007 |

OTHER PUBLICATIONS

Non-Final Rejection for Korean Patent Application No. 10-2011-7000897 mailed Jun. 11, 2012.

Toshiyuki Kaitsuka, Takeo Inoue, "Interference Cancellation System for Satellite Communication Earth Station", IEEE Transactions on Communications. vol. com-32, No. 7, pp. 796-803, Jul. 1984.

Fazel, Khaled, "Narrow-Band Interference Rejection in Orthogonal Multi-carrier Spread-Spectrum Communications," Third Annual International Conference on Universal Personal Communications, Proceedings, San Diego, CA, Sep. 27-Oct. 1, 1994, pp. 46-50.

Office Action, European Patent Application No. 09 800 450.0, Jan. 4, 2013.

First Office Action, Chinese Patent Application No. 200980127450.4, Mar. 25, 2013.

\* cited by examiner

RECEPTION DEVICE AND RECEPTION METHOD

TECHNICAL FIELD

The present invention relates to a reception device and a reception method which reduce the effect of an interference signal in a multicarrier transmission scheme.

Priority is claimed on Japanese Patent Application No. 2008-192465 filed on Jul. 25, 2008, the content of which is incorporated herein by reference.

BACKGROUND ART

Recently, with the spread of wireless communication devices, signals of various frequency bands have been propagated in the air. Thus, when a desired signal (hereinafter, referred to as a "desired signal") is received, a reception device receives an interference signal in the same frequency band as that of the desired signal, along with the desired signal. This causes a problem in that the reception accuracy of the desired signal is degraded in the reception device by the interference signal received by the reception device along with the desired signal.

To solve this problem, a technique has been proposed which generates a replica of an interference signal (hereinafter, referred to as an "interference signal replica") based on a spectrum of a received signal (hereinafter, referred to as a "reception signal") and included in the received signal, and estimates a desired signal that is not affected by the interference signal by subtracting the interference signal replica from the reception signal (for example, see Non-Patent Document 1).

Figure 11:
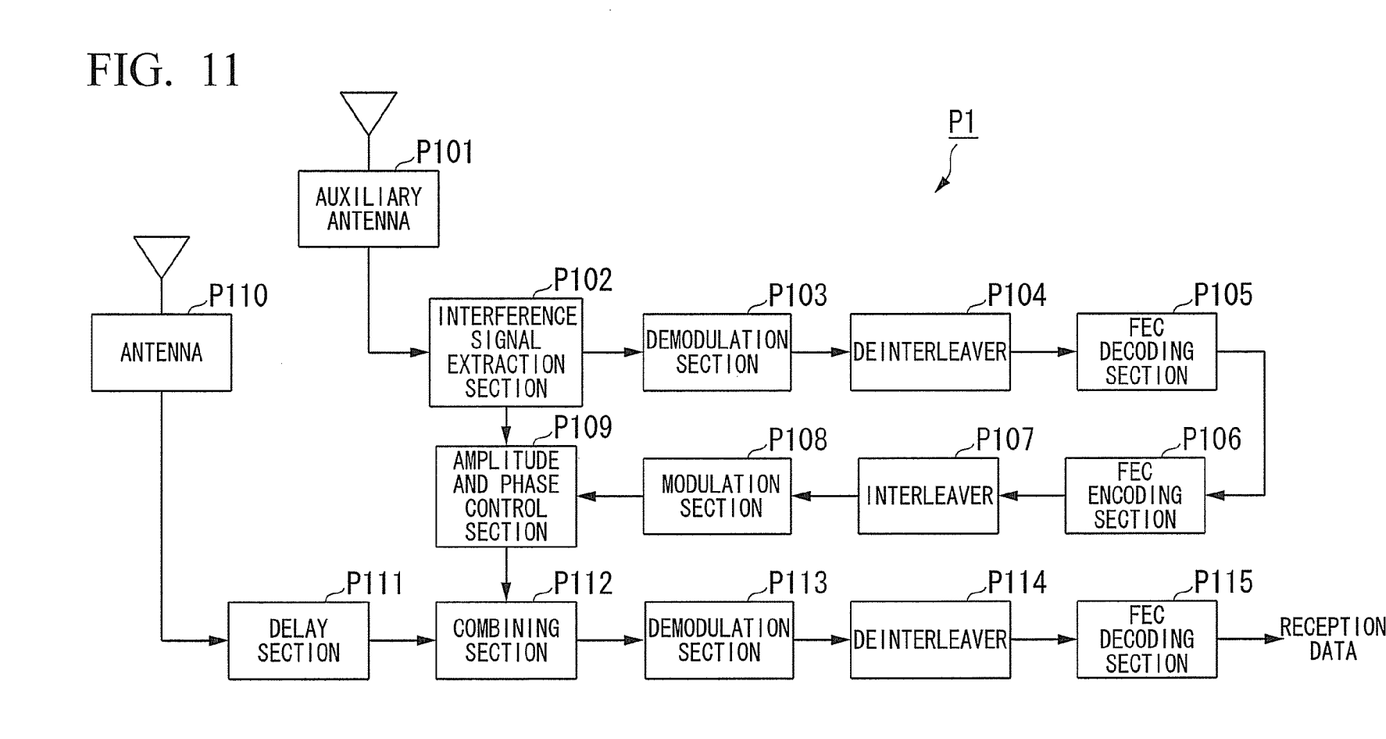
FIG. 11 is a block diagram showing a functional configuration of a reception device configured using the related art.

FIG. 11 is a block diagram showing a functional configuration of a reception device P1 configured using the related art. The reception device P1 includes an auxiliary antenna P101, an interference signal extraction section P102, a demodulation section P103, a deinterleaver P104, a FEC decoding section P105, an FEC encoding section P106, an interleaver P107, a modulation section P108, a phase amplitude adjustment section P109, an antenna P110, a delay section P111, a combining section P112, a demodulation section P113, a deinterleaver P114, and an FEC decoding section P115.

An antenna having directivity is applied to the auxiliary antenna P101, and the auxiliary antenna P101 receives a signal arriving from a direction of a transmission source of an interference signal whose position is identified. The interference signal extraction section P102 extracts the interference signal from the signal received by the auxiliary antenna P101 based on content of a communication scheme identified from the interference signal. The demodulation section P103 demodulates the interference signal extracted by the interference signal extraction section P102. The deinterleaver P104 deinterleaves a demodulation signal generated by the demodulation section P103. The FEC decoding section P105 decodes the demodulation signal deinterleaved by the deinterleaver P104 according to Forward Error Correction (hereinafter, referred to as FEC), and generates a bit sequence in which an error bit or error bits are corrected. The FEC encoding section P106 codes the bit sequence generated by the FEC decoding section P105 according to FEC, and generates a coded signal. The interleaver P107 interleaves the coded signal generated by the FEC encoding section P106. The modulation section P108 generates an interference signal replica by modulating the coded signal interleaved by the interleaver P107. The amplitude and phase control section P109 changes a phase of the interference signal replica generated by the modulation section P108 by 180 degrees. The amplitude and phase control section P109 generates a reversed-phase interference signal replica by causing an amplitude of the phase-changed interference signal replica to be consistent with an amplitude of the interference signal extracted by the interference signal extraction section P102. The combining section P112 generates the reception signal in which an interference signal component is reduced by combining the reception signal received by the antenna P110 and delayed by the delay section P111 with the reversed-phase interference signal replica generated by the amplitude and phase control section P109. The demodulation section P113 demodulates the reception signal in which the interference signal component is reduced. The deinterleaver P114 deinterleaves the demodulation signal generated by the demodulation section P113. The FEC decoding section P115 decodes the demodulation signal deinterleaved by the deinterleaver P114 according to FEC, generates a bit sequence in which an error bit or error bits are corrected, and outputs reception data.

The reception device P1 configured as described above generates the interference signal replica by the auxiliary antenna P101, the interference signal extraction section P102, the demodulation section P103, the deinterleaver P104, the FEC decoding section P105, the FEC encoding section P106, the interleaver P107, and the modulation section P108, subtracts the interference signal replica from the reception signal received by the antenna P110 using the amplitude and phase control section P109 and the combining section P112, and generates a desired signal.

[Non-patent Document 1] TOSHIYUKI KAITSUKA, TAKEO INOUE, "Interference Cancellation System for Satellite Communication Earth Station", IEEE Transactions on Communications, Vol. com-32, No. 7, pp. 796-803, July 1984.

DISCLOSURE OF INVENTION

Problem to be Solved by the Invention

However, there is a problem in that a circuit size is increased since circuits for generating the interference signal replica and subtracting the interference signal replica from the reception signal, that is, the auxiliary antenna P101, the interference signal extraction section P102, the demodulation section P103, the deinterleaver P104, the FEC decoding section P105, the FEC encoding section P106, the interleaver P107, the modulation section P108, the phase amplitude adjustment section P109, the delay section P111, and the combining section P112, are necessary in the reception device P1. Also, in the reception device P1, there is a problem in that a necessary processing time until reception data is output after the reception signal is received is lengthened since the delay section P111 needs to apply a time (delay) necessary for interference replica generation to the reception signal.

The present invention has been made in view of the above-described circumstances, and an object of the invention is to provide a reception device and a reception method capable of reducing the effect of an interference signal while suppressing increases in circuit size and processing time.

Means for Solving the Problem

[1] For solving the above-described problem, in an aspect of the invention, a reception device including a reception section which receives a multicarrier signal and an interference signal via a radio transmission path, an interference signal frequency position detection section which detects a frequency position of the interference signal (for example, a center frequency of an interference signal and a frequency bandwidth of the interference signal in the embodiment), a filter section which suppresses (attenuating) the multicarrier signal and the interference signal at the detected frequency position of the interference signal, a guard interval removal section (for example, a demodulation section 17 in the embodiment) which removes a guard interval from the multicarrier signal suppressed by the filter section, a subcarrier demodulation section (for example, the demodulation section 17 in the embodiment) which demodulates each subcarrier of the multicarrier signal from which the guard interval is removed, and an error correction section (for example, an FEC decoding section 19 in the embodiment) which performs error correction on the demodulated signal.

[2] In another aspect of the invention, the reception device further includes an auxiliary antenna, wherein the interference signal frequency position detection section detects the frequency position of the interference signal using the auxiliary antenna.

[3] In another aspect of the invention, when the multicarrier signal as a desired signal is not transmitted, the interference signal frequency position detection section detects the frequency position of the interference signal by detecting a reception level of a signal of a frequency band of the desired signal.

[4] In another aspect of the invention, the filter section operates as a filter including a low-pass filter if the frequency position of the interference signal is laid at higher-side of a frequency band of the multicarrier signal, operates as a filter including a high-pass filter if the frequency position of the interference signal is laid at lower-side of the frequency band of the multicarrier signal, operates as a filter including a notch filter if the frequency position of the interference signal is included in the frequency band of the multicarrier signal, and operates as a filter including a band-pass filter if a plurality of interference signals are present and frequency positions thereof are laid at higher-side and lower-side of the frequency band of the multicarrier signal.

[5] In another aspect of the invention, a reception method including a reception step of receiving, by a reception device, a multicarrier signal and an interference signal via a radio transmission path, an interference signal frequency position detection step of detecting, by the reception device, a frequency position of the interference signal, a filtering step of suppressing, by the reception device, the multicarrier signal and the interference signal at the detected frequency position of the interference signal, a guard interval removal step of removing, by the reception device, a guard interval from the multicarrier signal suppressed by the filtering step, a subcarrier demodulation step of demodulating, by the reception device, each subcarrier of the multicarrier signal from which the guard interval is removed, and an error correction step of performing, by the reception device, error correction on the demodulated signal.

[6] In another aspect of the invention, the reception device includes an auxiliary antenna, and the reception device detects the frequency position of the interference signal using the auxiliary antenna in the interference signal frequency position detection step.

[7] In another aspect of the invention, when the multicarrier signal as a desired signal is not transmitted, the reception device detects the frequency position of the interference signal by detecting a reception level of a signal of a frequency band of the desired signal in the interference signal frequency position detection step.

[8] In another aspect of the invention, in the filtering step, the reception device operates as a filter including a low-pass filter if the frequency position of the interference signal is laid at higher-side of a frequency band of the multicarrier signal, operates as a filter including a high-pass filter if the frequency position of the interference signal is laid at lower-side of the frequency band of the multicarrier signal, operates as a filter including a notch filter if the frequency position of the interference signal is included in the frequency band of the multicarrier signal, and operates as a filter including a band-pass filter if a plurality of interference signals are present and frequency positions thereof are laid at higher-side and lower-side of the frequency band of the multicarrier signal.

Effects of the Invention

In the reception device constituted as described above, the interference signal frequency position detection section detects the frequency position of the interference signal when the interference signal is included in a signal received by the reception section, and the filter section suppresses the multicarrier signal and the interference signal at the frequency position from which the interference signal is detected. A circuit for constituting the interference signal frequency position detection section and the filter section has a small circuit size compared to a circuit for constituting a generation section generating an interference replica in the related art. A processing time necessary for the interference signal frequency position detection section and the filter section is short compared to processing for generating the interference replica in the related art.

Accordingly, the present invention can reduce the effect of an interference signal while suppressing increases in circuit size and processing time.

EMBODIMENTS FOR CARRYING OUT THE INVENTION

Figure 1:
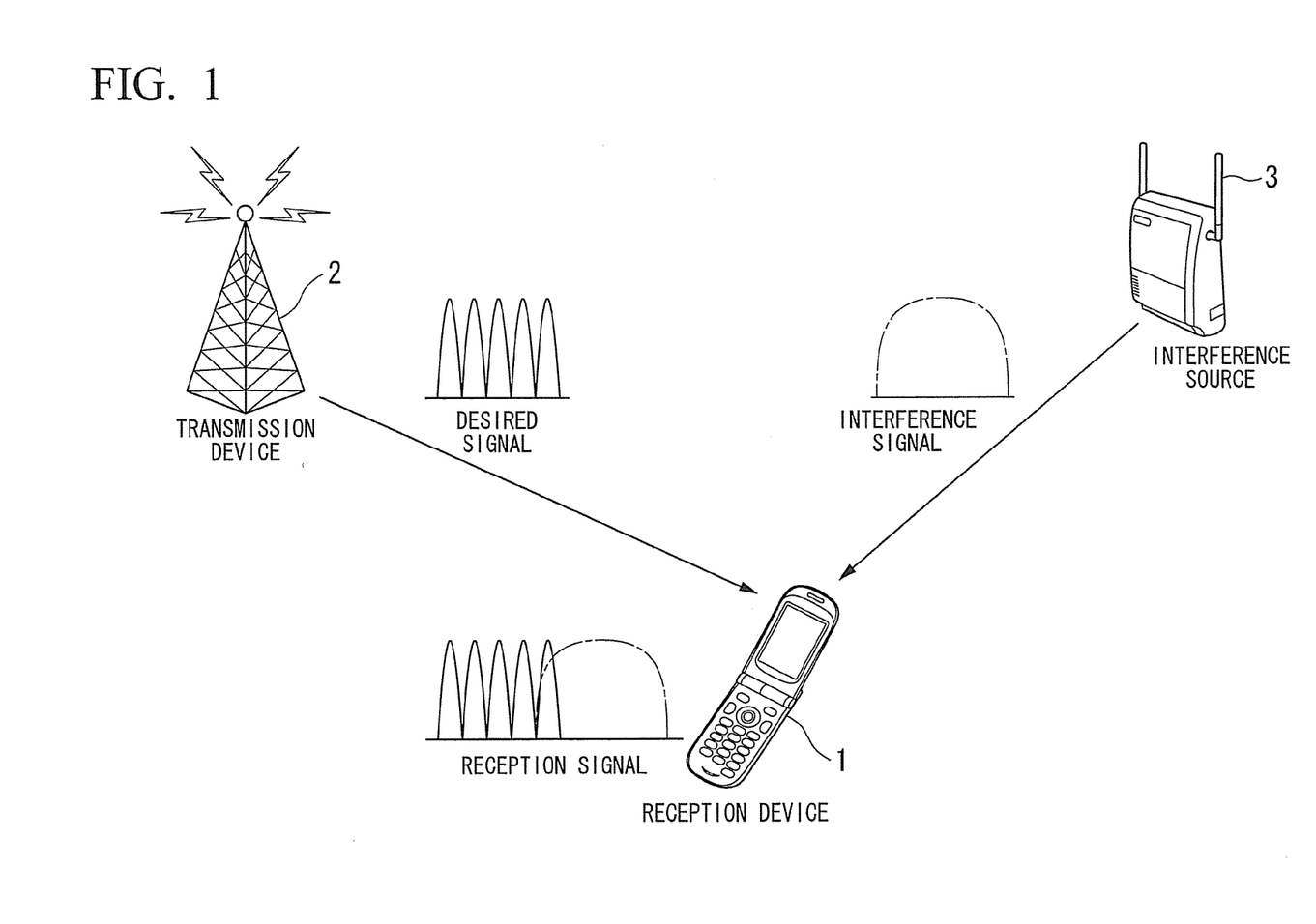
FIG. 1 is a schematic diagram showing the outline of a network environment of a reception device.

FIG. 1 is a schematic diagram showing the outline of a network environment of a reception device. As shown, a reception device 1 receives a combined signal of a multicarrier signal (hereinafter, referred to as a "desired signal") transmitted by multicarrier transmission from a transmission device 2 via a radio transmission path and a signal (hereinafter, referred to as an "interference signal") transmitted from an interference source 3.

The transmission device 2 decides desired signal information including a center frequency of the desired signal and a frequency bandwidth of the desired signal when starting communication with the reception device 1, and transmits the decided desired signal information to the reception device 1. The transmission device 2 transmits the desired signal to the reception device 1 according to the decided desired signal information.

The interference source 3 transmits the interference signal, that is, a signal different from the desired signal. For example, in FIG. 1, a wireless local area network (LAN) base station operates as the interference source 3, and a signal transmitted by the interference source 3 to another reception device different from the reception device 1 interferes with the desired signal. Hereinafter, the signal interfering with the desired signal is referred to as an "interference signal".

Figure 2:
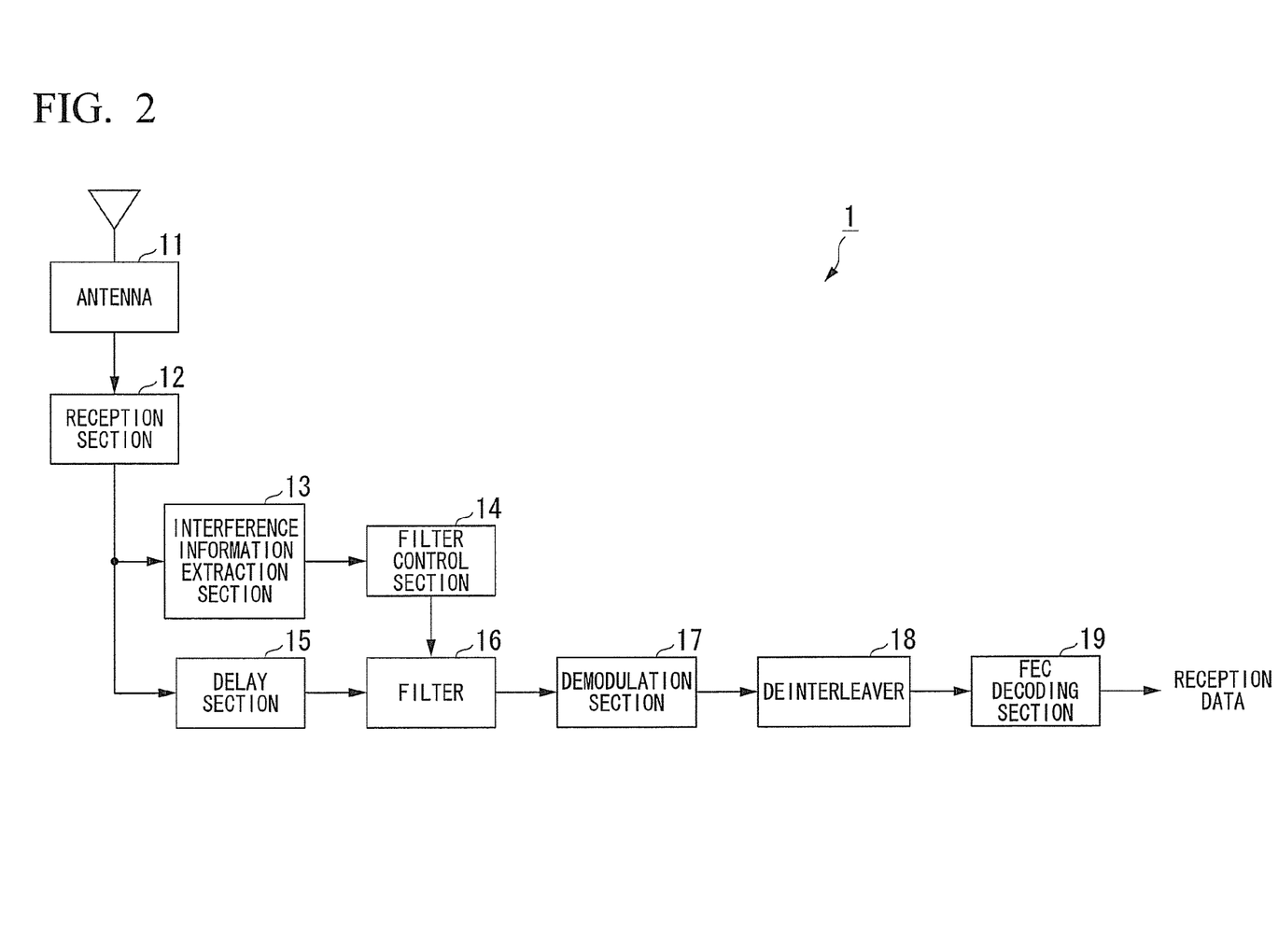
FIG. 2 is a block diagram showing a functional configuration of the reception device.

FIG. 2 is a block showing a functional configuration of the reception device 1. As shown, the reception device 1 has an antenna 11, a reception section 12, an interference information extraction section 13, a filter control section 14, a delay section 15, a filter 16, a demodulation section 17, a deinterleaver 18, and an FEC decoding section 19.

The antenna 11 receives a combined signal in which a desired signal is combined with an interference signal.

The reception section 12 performs down-conversion and analog/digital conversion on the received reception signal.

The interference information extraction section 13 performs an interference information extraction process of extracting interference information including a center frequency of the interference signal and a frequency bandwidth of the interference signal from the reception signal based on desired signal information to be decided when communication with the transmission device 2 is started.

The interference information extraction process is possible by an existing technique. For example, the interference information extraction section 13 calculates a frequency spectrum of the reception signal by performing fast Fourier transform (FFT) on the reception signal, estimates a frequency spectrum of the interference signal by calculating a difference between the calculated frequency spectrum of the reception signal and an estimation result of the frequency spectrum of the desired signal obtained based on the desired signal information, and extracts interference information based on the estimation result.

The filter control section 14 stores the desired signal information when communication with the transmission device 2 is started, decides parameters of a filter satisfying the following two conditions based on the desired signal information and the interference information extracted by the interference information extraction section 13, and sets the decided parameters to the filter 16.

(1) A reception signal of a frequency band containing no interference signal and containing only a desired signal is passed, and (2) a reception signal of a frequency band containing an interference signal is attenuated.

For example, the filter parameters include a type of filter and a cutoff frequency.

The delay section 15 applies to the reception signal 12 a time delay corresponding to a time which is needed for the interference information extraction section 13 and the filter control section 14 finish processing after the reception section 12 finishes processing, and outputs the reception signal to the filter 16. An amount of the delay applied to the reception signal 12 by the delay section 15 is preset based on design requirements.

The filter 16 filters the reception signal delayed by the delay section 15 based on the filter of the parameters set by the filter control section 14. That is, the filter 16 filters a reception signal referred to by the filter control section 14 upon parameter decision based on the filter of the parameters set by the filter control section 14.

The demodulation section 17 generates a demodulation signal by removing a guard interval from the reception signal filtered by the filter 16, and performing an FFT process and a demodulation process.

The deinterleaver 18 deinterleaves the demodulation signal generated by the demodulation section 17.

The FEC decoding section 19 decodes the demodulation signal deinterleaved by the deinterleaver 18 according to FEC, generates a bit sequence in which an error bit or error bits are corrected, and outputs reception data.

Figure 3:
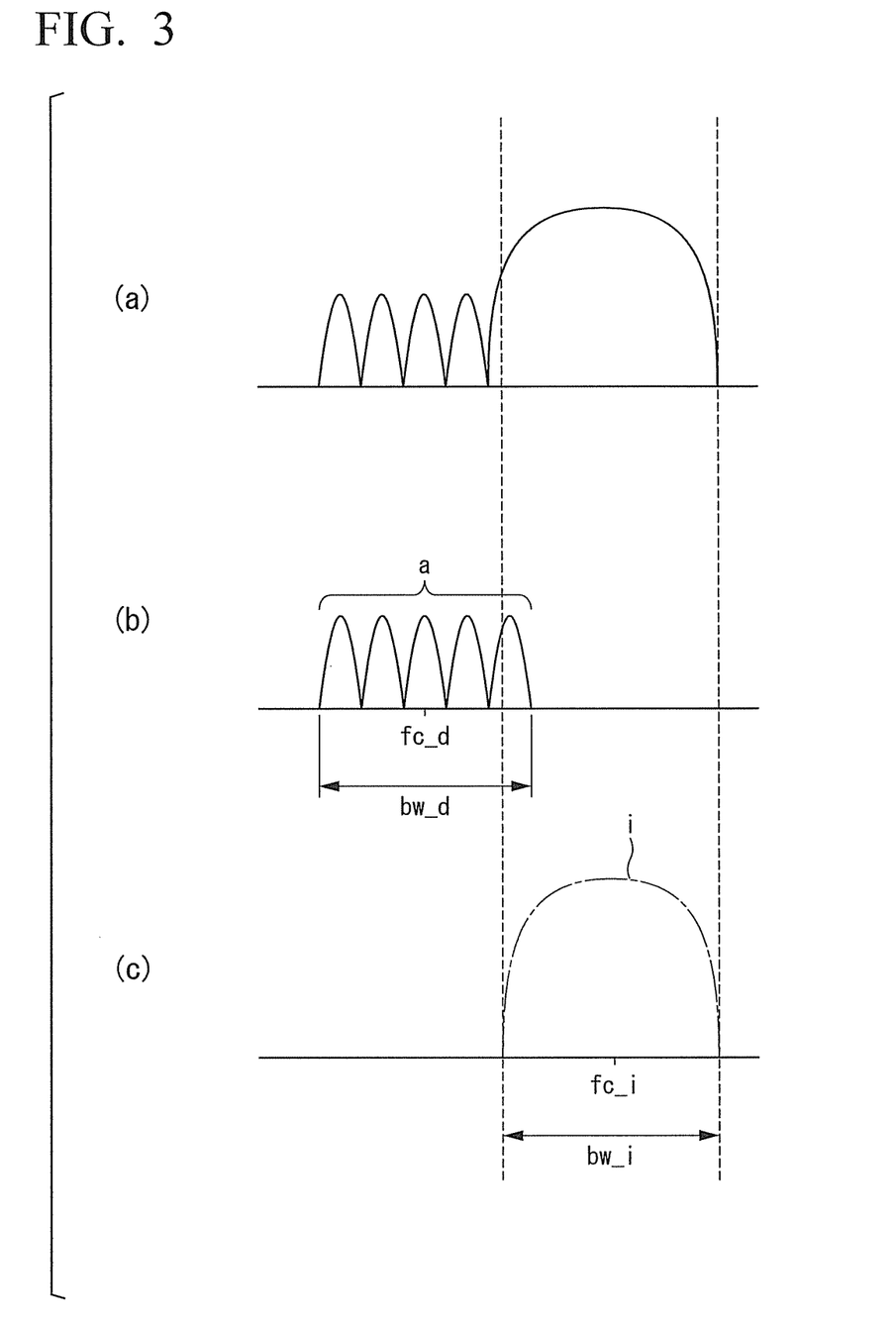
FIG. 3 is a conceptual diagram showing frequency spectra of a reception signal, a desired signal, and an interference signal.

FIG. 3 is a conceptual diagram showing frequency spectra of a reception signal, a desired signal, and an interference signal. In FIG. 3, the vertical axis represents power and the horizontal axis represents a frequency. FIG. 3(*a*) is a conceptual diagram showing a frequency spectrum of a signal received by the antenna 11. FIG. 3(*b*) is a conceptual diagram showing a frequency spectrum of a desired signal included in the reception signal of FIG. 3(*a*). In FIG. 3(*b*), an "a" symbol indicates a frequency spectrum of a desired signal, fc_d indicates a center frequency of the desired signal, and bw_d indicates a frequency bandwidth of the desired signal. FIG. 3(*c*) is a conceptual diagram showing a frequency spectrum of an interference signal included in the reception signal of FIG. 3(*a*). In FIG. 3(*c*), an "i" symbol indicates a frequency spectrum of an interference signal, fc_i indicates a center frequency of the interference signal, and bw_i indicates a frequency bandwidth of the interference signal.

Next, details of the operation of the filter control section 14 will be described. The filter control section 14 calculates relative positions of the desired signal and the interference signal based on the desired signal information and the interference information, and decides filter parameters to be applied to the filter 16 according to the calculation results. Specifically, the filter control section 14 selects a type of filter to be applied to the filter 16 from among a high-pass filter, a low-pass filter, and a notch filter based on the desired signal information and the interference information. The filter control section 14 decides a cutoff frequency. The filter control section 14 controls the filter 16 according to the decided filter type and cutoff frequency.

FIGS. 4 to 8 are schematic diagrams showing the outline of a filter control process to be performed by the filter control section 14. Hereinafter, details of the filter control process will be described in detail using FIGS. 4 to 8.

Figure 4:
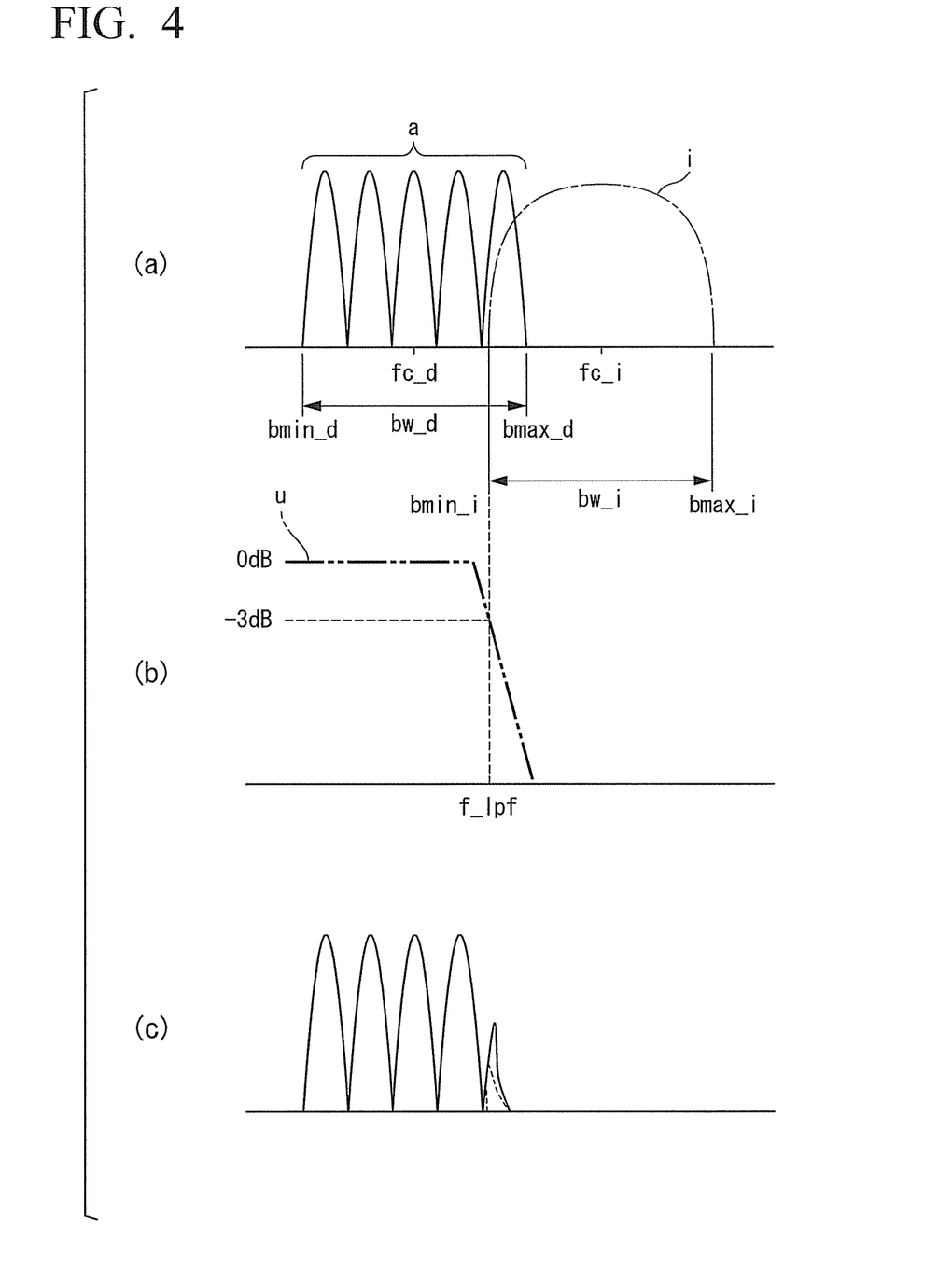
FIG. 4 is a schematic diagram showing the outline of a filter control process to be performed by a filter control section.

FIG. 4 is a schematic diagram showing the outline of a filter control process when the filter control section 14 sets a low-pass filter to the filter 16. FIG. 4(*a*) is a schematic diagram showing a frequency spectrum of a signal received by the antenna 11 divided into a frequency spectrum of a desired signal and a spectrum of an interference signal. In FIG. 4(*a*), the vertical axis represents power, the horizontal axis represents a frequency, an "a" symbol indicates the frequency spectrum of the desired signal, and an "i" symbol indicates the frequency spectrum of the interference signal. The filter control section 14 calculates a maximum value bmax_i of a frequency band of the interference signal based on a center frequency and a frequency bandwidth of the interference signal, calculates a maximum value bmax_d of a frequency band of the desired signal based on a center frequency and a frequency bandwidth of the desired signal, and applies the low-pass filter to the filter 16 when bmax_i is higher than bmax_d (FIG. 4(a)).

FIG. 4(b) is a schematic diagram showing the outline of the low-pass filter applied to the filter 16 by the filter control section 14. In FIG. 4(b), the vertical axis represents a gain (whose unit is dB), and the horizontal axis represents a frequency (whose unit is Hz). In this case, the filter control section 14 calculates a minimum value bmin_i of the frequency band of the interference signal based on the center frequency and the frequency bandwidth of the interference signal, and decides a value of a cutoff frequency (a frequency at which a gain of the low-pass filter becomes −3 dB) of the low-pass filter as bmin_i. The filter control section 14 sets parameters indicating that the filter type is the low-pass filter and the cutoff frequency is bmin_i to the filter 16 as indicated by a "u" symbol.

FIG. 4(c) is a schematic diagram showing a frequency spectrum after the reception signal shown in FIG. 4(a) is filtered by the filter 16 in which the low-pass filter shown in FIG. 4(b) is set. As shown, the filter 16 attenuates the power of a signal having a frequency that is higher than the minimum value bmin_i of the frequency band of the interference signal, regardless of whether the signal is the desired signal or the interference signal.

Figure 5:
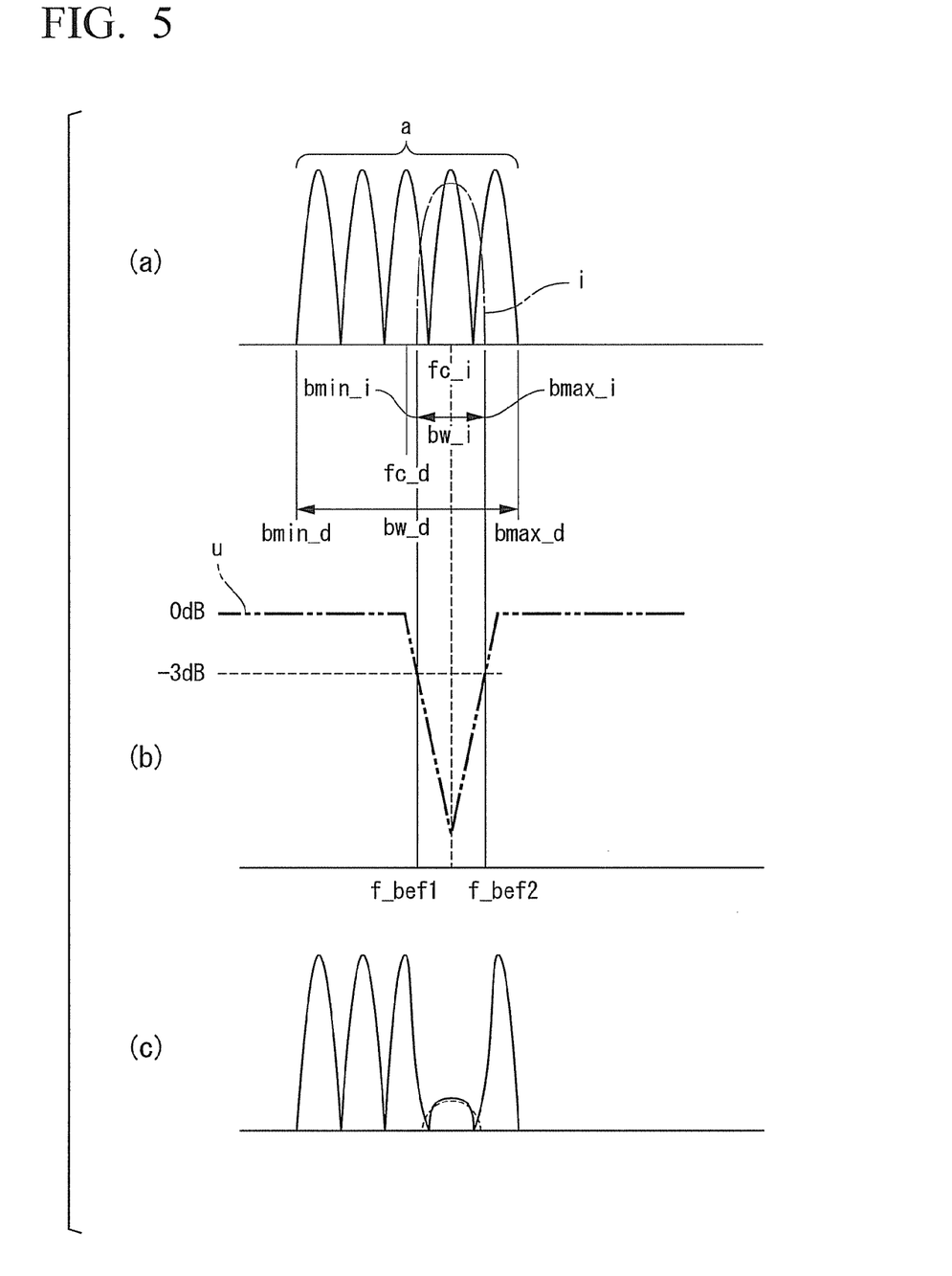
FIG. 5 is a schematic diagram showing the outline of a filter control process to be performed by the filter control section.

FIG. 5 is a schematic diagram showing the outline of a filter control process when the filter control section 14 sets a notch filter to the filter 16. FIG. 5(a) is a schematic diagram showing a frequency spectrum of a signal received by the antenna 11 divided into a frequency spectrum of a desired signal and a spectrum of an interference signal. In FIG. 5(a), the vertical axis represents power, the horizontal axis represents a frequency, an "a" symbol indicates the frequency spectrum of the desired signal, and an "i" symbol indicates the frequency spectrum of the interference signal. The filter control section 14 calculates a maximum value bmax_i and a minimum value bmin_i of a frequency band of the interference signal based on a center frequency and a frequency bandwidth of the interference signal, calculates a maximum value bmax_d and a minimum value bmax_d of a frequency band of the desired signal based on a center frequency and a frequency bandwidth of the desired signal, and applies the notch filter to the filter 16 when bmax_i is lower than bmax_d and bmin_i is higher than bmin_d (FIG. 5(a)).

FIG. 5(b) is schematic diagram showing the outline of the notch filter applied to the filter 16 by the filter control section 14. In FIG. 5(b), the vertical axis represents a gain (whose unit is dB), and the horizontal axis represents a frequency (whose unit is Hz). In this case, the filter control section 14 calculates the minimum value bmin_i and the maximum value bmax_i of the frequency band of the interference signal based on the center frequency and the frequency bandwidth of the interference signal, and decides values of two cutoff frequencies (two frequencies at which a gain of the notch filter becomes −3 dB) of the notch filter as bmin_i and bmax_i. The filter control section 14 sets parameters indicating that the filter type is the notch filter and the two cutoff frequencies are bmin_i and bmax_i to the filter 16 as indicated by a "u" symbol.

FIG. 5(c) is a schematic diagram showing a frequency spectrum after the reception signal shown in FIG. 5(a) is filtered by the filter 16 in which the notch filter shown in FIG. 5(b) is set. As shown, the filter 16 attenuates the power of a signal having a frequency between the minimum value bmin_i and the maximum value bmax_i of the frequency band of the interference signal, regardless of whether the signal is the desired signal or the interference signal.

Figure 6:
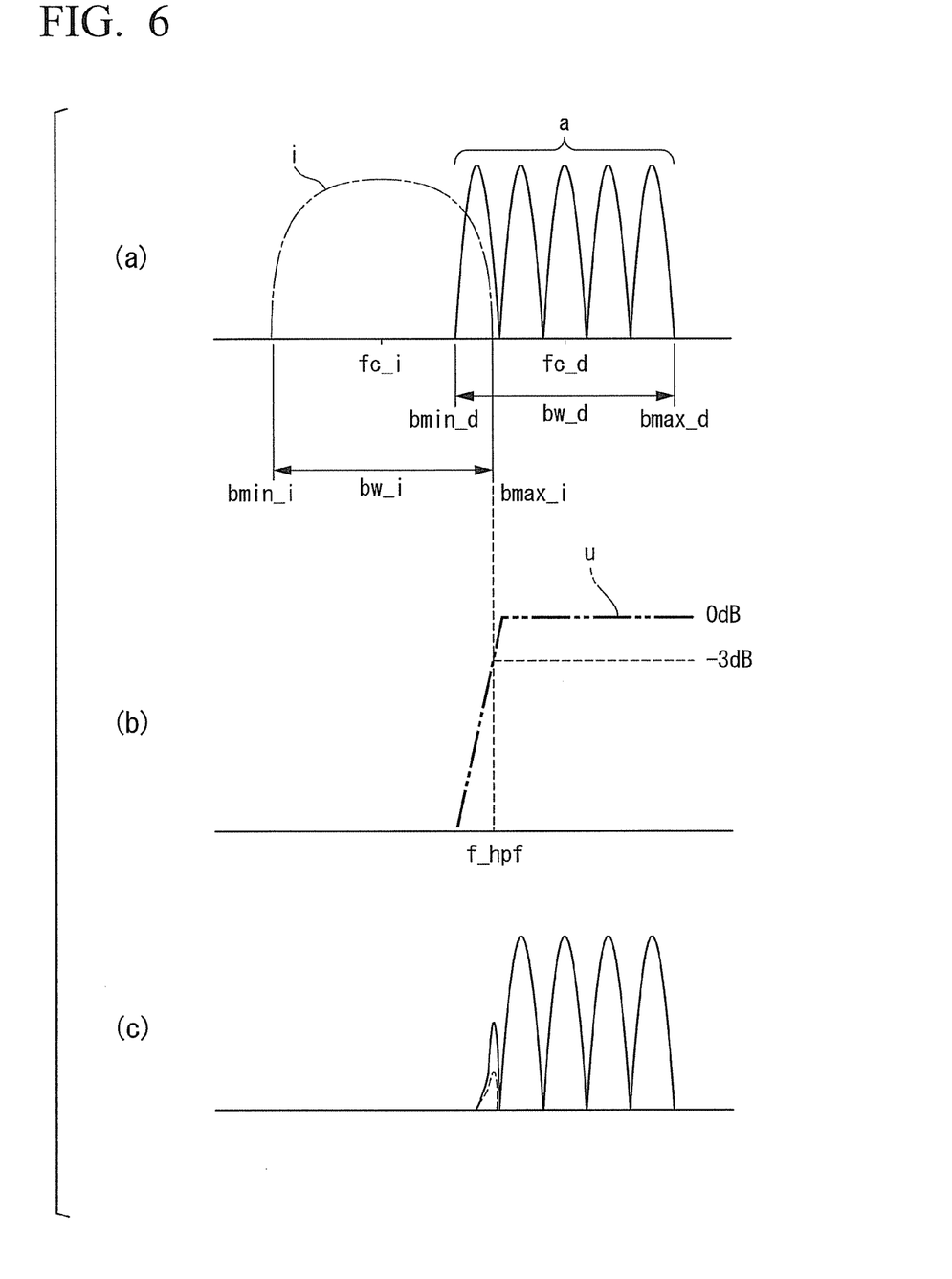
FIG. 6 is a schematic diagram showing the outline of a filter control process to be performed by the filter control section.

FIG. 6 is a schematic diagram showing the outline of a filter control process when the filter control section 14 sets a high-pass filter to the filter 16. FIG. 6(a) is a schematic diagram showing a frequency spectrum of a signal received by the antenna 11 divided into a frequency spectrum of a desired signal and a spectrum of an interference signal. In FIG. 6(a), the vertical axis represents power, the horizontal axis represents a frequency, an "a" symbol indicates the frequency spectrum of the desired signal, and an "i" symbol indicates the frequency spectrum of the interference signal. The filter control section 14 calculates a minimum value bmin_i of a frequency band of the interference signal based on a center frequency and a frequency bandwidth of the interference signal, calculates a minimum value bmin_d of a frequency band of the desired signal based on a center frequency and a frequency bandwidth of the desired signal, and applies the high-pass filter to the filter 16 when bmin_i is lower than bmin_d (FIG. 6(a)).

FIG. 6(b) is schematic diagram showing the outline of the high-pass filter applied to the filter 16 by the filter control section 14. In FIG. 6(b), the vertical axis represents a gain (whose unit is dB), and the horizontal axis represents a frequency (whose unit is Hz). In this case, the filter control section 14 calculates a maximum value bmax_i of the frequency band of the interference signal based on the center frequency and the frequency bandwidth of the interference signal, and decides a value of a cutoff frequency (a frequency at which a gain of the high-pass filter becomes −3 dB) of the high-pass filter as bmax_i. The filter control section 14 sets parameters indicating that the filter type is the high-pass filter and the cutoff frequency is bmax_i to the filter 16 as indicated by a "u" symbol.

FIG. 6(c) is a schematic diagram showing a frequency spectrum after the reception signal shown in FIG. 6(a) is filtered by the filter 16 in which the high-pass filter shown in FIG. 6(b) is set. As shown, the filter 16 attenuates the power of a signal having a frequency that is lower than the maximum value bmax_i of the frequency band of the interference signal, regardless of whether the signal is the desired signal or the interference signal.

Figure 7:
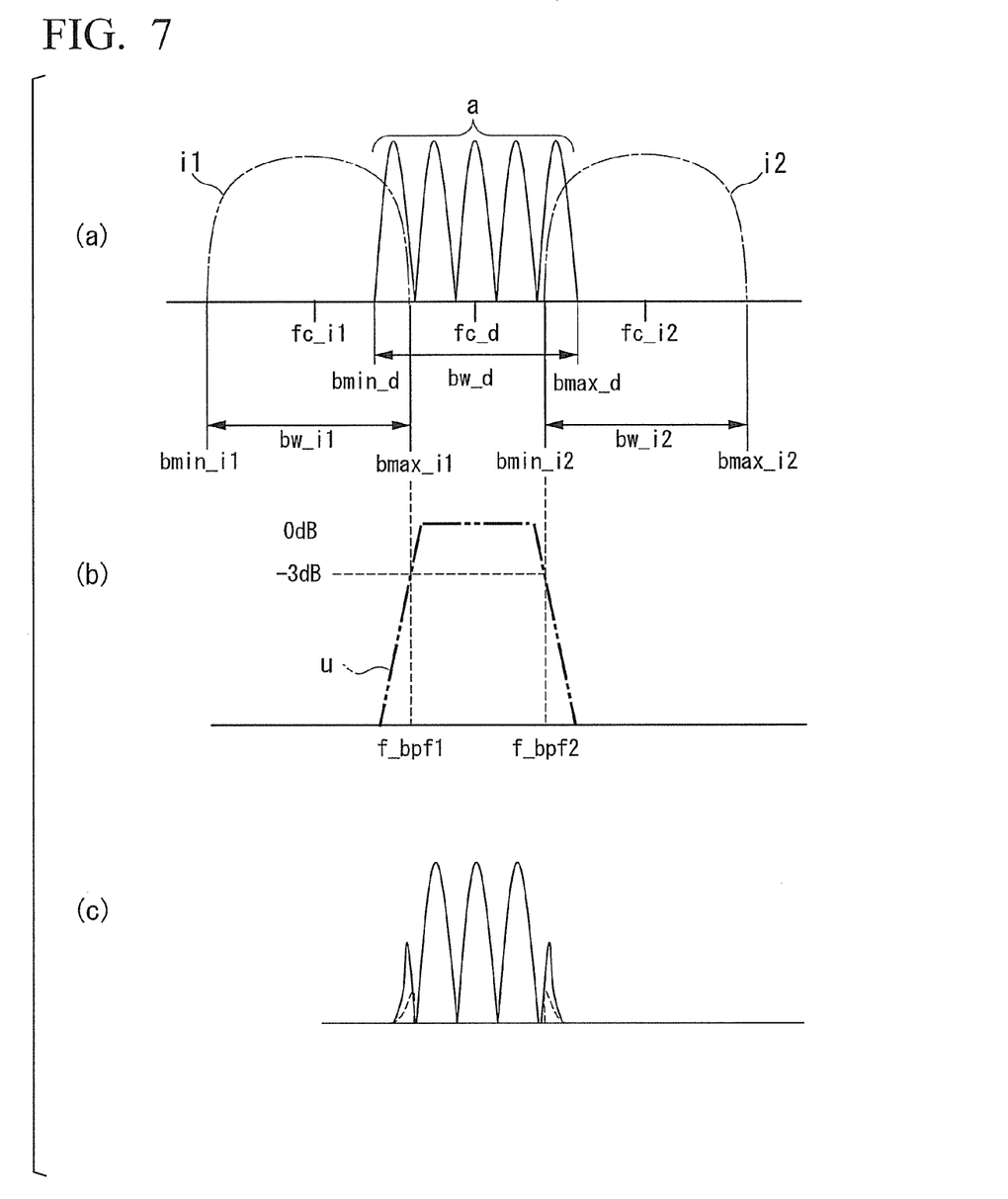
FIG. 7 is a schematic diagram showing the outline of a filter control process to be performed by the filter control section.

FIG. 7 is a schematic diagram showing the outline of a filter control process when the filter control section 14 sets a band-pass filter to the filter 16. FIG. 7(a) is a schematic diagram showing a frequency spectrum of a signal received by the antenna 11 divided into a frequency spectrum of a desired signal and a spectrum of an interference signal. In FIG. 7(a), the vertical axis represents power, the horizontal axis represents a frequency, an "a" symbol indicates the frequency spectrum of the desired signal, and "i1" and "i2" symbols indicate frequency spectra of interference signals. The filter control section 14 applies the band-pass filter to the filter 16 if frequency spectra are present at higher and lower frequencies than that of the frequency spectrum of the desired signal, for example, if both the interference signal shown in FIG. 4 and the interference signal shown in FIG. 6 are present.

FIG. 7(b) is a schematic diagram showing the outline of the band-pass filter applied to the filter 16 by the filter control section 14. In FIG. 7(b), the vertical axis represents a gain (whose unit is dB), and the horizontal axis represents a frequency (whose unit is Hz). In this case, the filter control section 14 calculates a maximum value bmax_i of a frequency band of the interference signal i1 based on a center frequency and a frequency bandwidth of the interference signal i1 of a low-frequency side, and decides a value of a cutoff frequency (a frequency at which a gain of the band-pass filter becomes −3 dB) of a low-frequency side of the band-pass filter as bmax_i1. Also, the filter control section 14 calculates a minimum value bmin_i2 of a frequency band of the interference signal i2 based on a center frequency and a frequency bandwidth of the interference signal i2 of a high-frequency side, and decides a value of a cutoff frequency of a high-frequency side of the band-pass filter as bmin_i2. The filter control section 14 sets parameters indicating that the filter type is the band-pass filter and the cutoff frequencies are bmax_i1 and bmin_i2 to the filter 16 as indicated by a "u" symbol.

FIG. 7(c) is a schematic diagram showing a frequency spectrum after the reception signal shown in FIG. 7(a) is filtered by the filter 16 in which the band-pass filter shown in FIG. 7(b) is set. As shown, the filter 16 attenuates power of a signal of a frequency that is lower than the maximum value bmax_i1 of the frequency band of the interference signal i1, and power of a signal of a frequency that is higher than the minimum value bmin_i2 of the frequency band of the interference signal i2, regardless of whether the signal is the desired signal or the interference signal.

Figure 8:
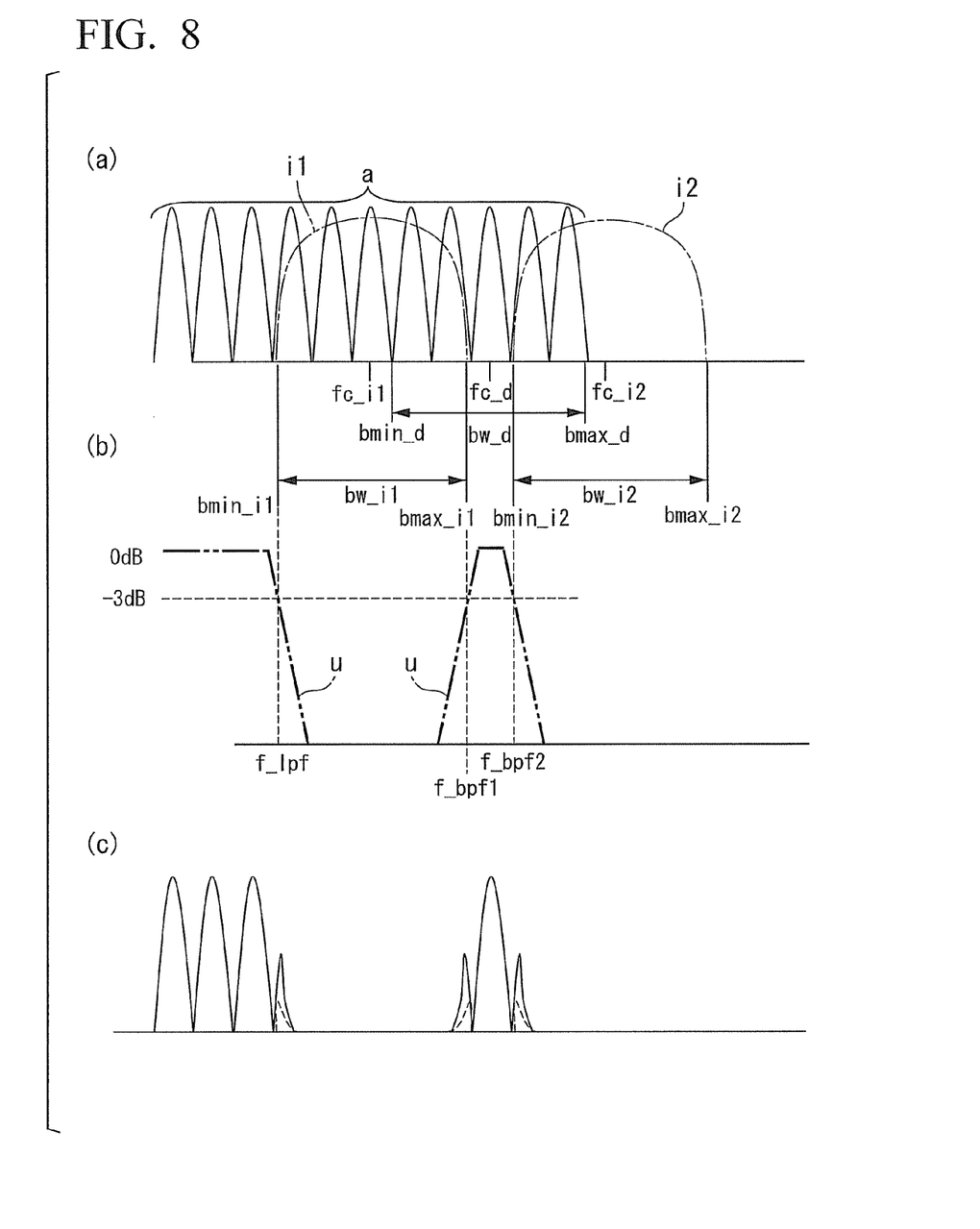
FIG. 8 is a schematic diagram showing the outline of a filter control process to be performed by the filter control section.

FIG. 8 is a schematic diagram showing the outline of a filter control process when the filter control section 14 sets a combination of a plurality of filters to the filter 16. FIG. 8(a) is a schematic diagram showing a frequency spectrum of a signal received by the antenna 11 divided into a frequency spectrum of a desired signal and a spectrum of an interference signal. In FIG. 8(a), the vertical axis represents power, the horizontal axis represents a frequency, an "a" symbol indicates the frequency spectrum of the desired signal, and "i1" and "i2" symbols indicate frequency spectra of interference signals. The filter control section 14 applies a combination of a low-pass filter and a band-pass filter to the filter 16 if a frequency that is higher than that of the frequency spectrum of the desired signal, and the frequency spectrum of the interference signal in the frequency spectrum of the desired signal are present, for example, if both the interference signal shown in FIG. 4 and the interference signal shown in FIG. 5 are present.

FIG. 8(b) is a schematic diagram showing the outline of the low-pass filter and the band-pass filter applied to the filter 16 by the filter control section 14. In FIG. 8(b), the vertical axis represents a gain (whose unit is dB), and the horizontal axis represents a frequency (whose unit is Hz). In this case, the filter control section 14 calculates a minimum value bmin_i1 and a maximum value bmax_i1 of a frequency band of the interference signal i1 based on a center frequency and a frequency bandwidth of the interference signal i1, which is in the frequency spectrum of the desired signal, and respectively sets the minimum value bmin_i1 and the maximum value bmax_i1 as values of a cutoff frequency of the low-pass filter and a cutoff frequency of a low-frequency side of the band-pass filter. Also, the filter control section 14 calculates a minimum value bmin_i2 of a frequency band of the interference signal i2 based on a center frequency and a frequency bandwidth of the interference signal i2 of a high-frequency side, and decides a value of a cutoff frequency of a high-frequency side of the band-pass filter as bmin_i2. The filter control section 14 sets parameters indicating that the filter type is the combination of the low-pass filter and the band-pass filter and the cutoff frequencies are respectively bmin_i1, bmax_i1, and bmin_i2 to the filter 16 as indicated by a "u" symbol.

FIG. 8(c) is a schematic diagram showing a frequency spectrum after the reception signal shown in FIG. 8(a) is filtered by the filter 16 in which the low-pass filter and the band-pass filter shown in FIG. 8(b) are set. As shown, the filter 16 attenuates power of a signal of a frequency interposed between the minimum value bmin_i1 and the maximum value bmax_i1 of the frequency band of the interference signal i1 and power of a signal having a frequency that is higher than the minimum value bmin_i2 of the frequency band of the interference signal i2, regardless of whether the signal is the desired signal or the interference signal.

Figure 9:
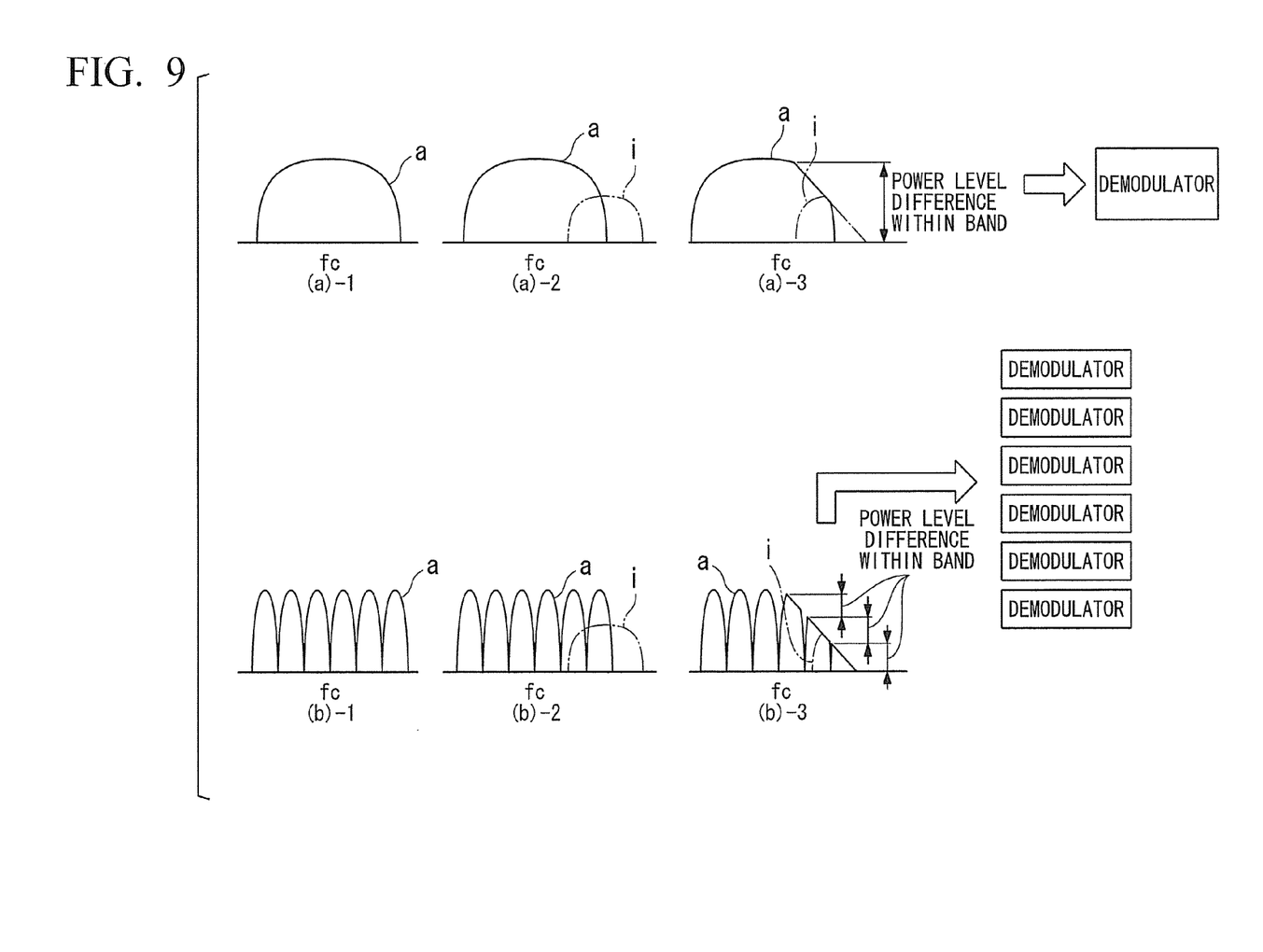
FIG. 9 is a conceptual diagram showing a difference between single carrier transmission and multicarrier transmission.

FIG. 9 is a conceptual diagram showing a difference between single carrier transmission and multicarrier transmission. In FIG. 9, an "a" symbol indicates a frequency spectrum of a desired signal, and an "i" symbol indicates a frequency spectrum of an interference signal. FIG. 9(a) is a conceptual diagram when filtering is applied upon single carrier transmission. FIG. 9(a)-1 shows a single carrier transmission spectrum, FIG. 9(a)-2 shows a signal spectrum upon interference, and FIG. 9(a)-3 shows a transmission spectrum after a suppression filter and a power level difference within a band by the suppression filter.

FIG. 9(b) is a conceptual diagram of the present invention when filtering is applied upon multicarrier transmission. FIG. 9(b)-1 shows a multicarrier transmission spectrum, FIG. 9(b)-2 shows a signal spectrum upon interference, and FIG. 9(b)-3 shows a transmission spectrum after a suppression filter and a power level difference within a band by the suppression filter.

As is apparent from a comparison between FIG. 9(a)-3 and FIG. 9(b)-3, the power level difference within the band is large in the single carrier transmission, and the large power level difference within the band affects demodulation characteristics, leading to large degradation. On the other hand, since it is possible to perform an independent demodulation process for each carrier in the multicarrier transmission, a power level difference within a band of each carrier is small compared to the single carrier transmission (see KOBAYASHI, "Fundamentals and Applications of OFDM Communication Scheme, Chapter 1", Triceps, 2004), and the degradation of demodulation characteristics in each demodulator is reduced.

Next, the operation and processing procedure of the reception device 1 will be described.

Figure 10:
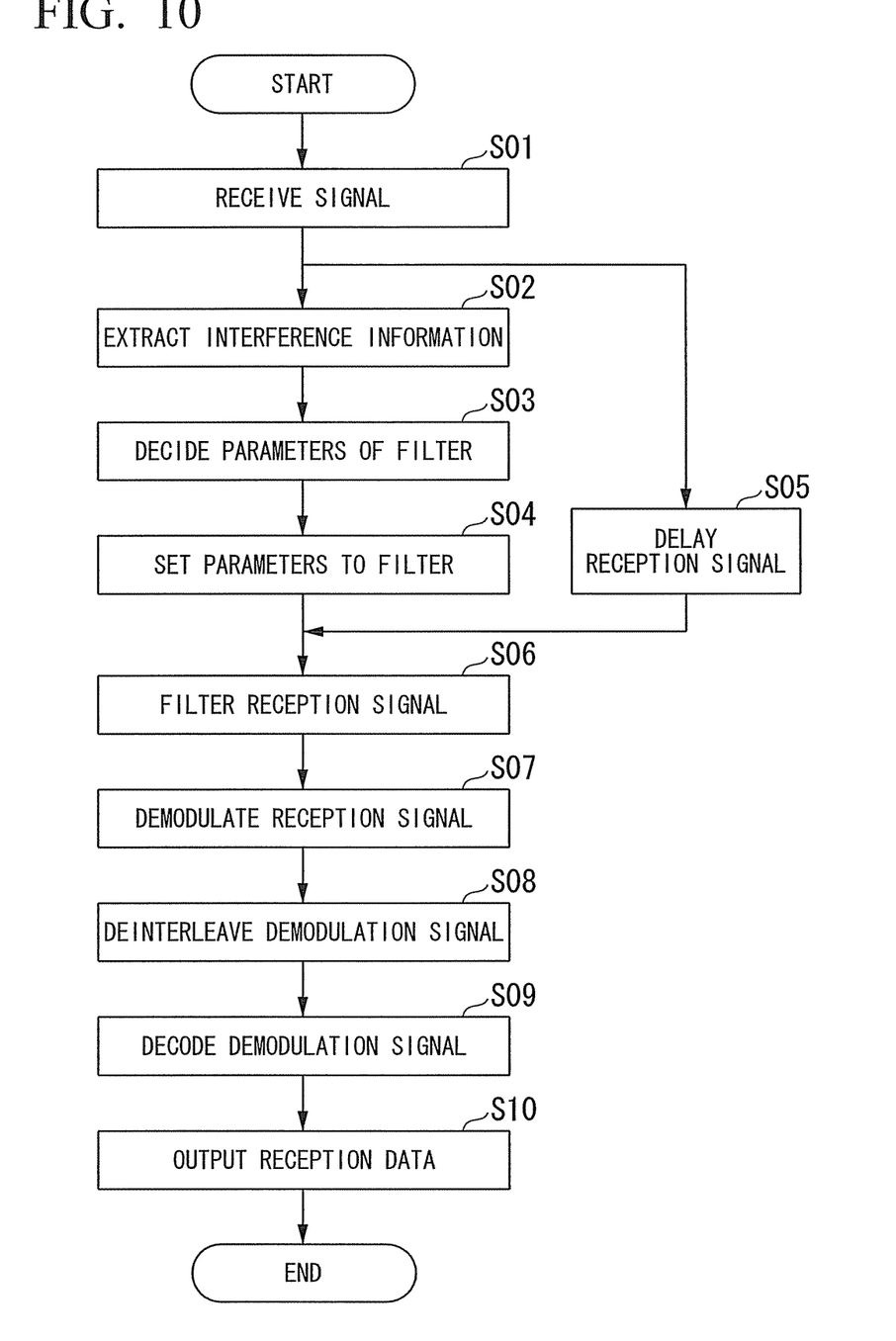
FIG. 10 is a flowchart showing a processing procedure when the reception device controls a filter.

FIG. 10 is a flowchart showing a processing procedure when the reception device 1 controls a filter.

As shown in FIG. 10, first, the antenna 11 receives a signal and the reception section 12 performs down-conversion and analog/digital conversion on the reception signal (step S01). Next, the interference information extraction section 13 extracts interference information from the reception signal processed by the reception section 12 (step S02). Next, the filter control section 14 decides a type of filter and a cutoff frequency of the filter as described above based on the interference information extracted by the interference information extraction section 13 and desired signal information stored by the filter control section 14 (step S03). The filter control section 14 sets the decided type and cutoff frequency of the filter to the filter 16.

In parallel with the process of steps S02 to S04, the delay section 15 delays the reception signal (step S05). Next, the filter 16 attenuates power of a frequency band containing an interference signal to the reception signal by forming a filter according to parameters set in step S04 and filtering the delayed reception signal (step S06). Next, the demodulation section 17 demodulates the reception signal passing through the filter 16, and generates a demodulation signal (step S07). Next, the deinterleaver 18 deinterleaves the demodulation signal (step S08). The FEC decoding section 19 performs an FEC decoding process on the deinterleaved demodulation signal (step S09), outputs decoded reception data (step S10), and terminates the entire process of the flowchart.

As described above, in the reception device 1, the interference information extraction section 13 extracts the interference information, and the filter control section 14 sets parameters of the filter, which attenuates a signal of a frequency band containing the interference signal, to the filter 16. Among signals included in the reception signal, the signal of the frequency band containing the interference signal is attenuated by the filter 16 filtering the reception signal. Thus, it is possible to reduce the effect of the interference signal in the reception signal. Also, it is possible to make the circuit size of the interference information extraction section 13, the filter control section 14, and the filter 16, which detect a center frequency and a frequency band of the interference signal, smaller than the circuit size of a circuit for generating an interference signal replica in the related art. Also, it is possible to cause a processing time necessary for processes of the interference information extraction section 13, the filter control section 14, and the filter 16, which detect the center frequency and the frequency band of the interference signal, to be shorter than a processing time necessary for generating the interference signal replica in the related art. Accordingly, it is possible to reduce the effects of the interference signal while suppressing increases in circuit size and processing time.

Since it is necessary to provide replica generation circuits whose number is the same as the number of interference signals or to repeatedly perform replica generation processes whose number is the same as the number of interference signals in the related art, it is inherently technically difficult to accurately generate the interference signal replica. Since this problem is solved by using a filter suitable for the frequency band containing the interference signal in the reception device 1, it is not necessary to complicate a configuration, and it is possible to solve the problem by easy processing, even when the number of interference signals is increased.

In the reception device 1, a desired signal of the frequency band containing the interference signal is also attenuated by the filter 16 along with the interference signal. However, since reception data is output by the demodulation section 17 removing a guard interval from the filtered reception signal and the FEC decoding section 19 performing error correction according to FEC, the reception device 1 can generate accurate reception data even when power of some subcarriers of the desired signal is attenuated.

MODIFIED EXAMPLE

A configuration in which the delay section 15 provided in the reception device 1 delays a reception signal and thus the filter 16 filters the reception signal referred to by the filter control section 14 upon decision of parameters based on a filter of the parameters set by the filter control section 14 has been described in the above-described embodiment, but the reception device 1 may not be provided with the delay section 15. In this case, when filtering is performed, the parameters set by the filter 16 are parameters decided based on interference information extracted from a reception signal received before the reception signal serving as a filtering target. Accordingly, a difference may occur between a cutoff frequency of a filter set to the filter 16 and the interference information extracted from the reception signal serving as the filtering target. However, a reception timing difference between the filtered reception signal and the reception signal referred to upon parameter decision is consistent with a processing time of the interference information extraction section 13 and the filter control section 14 and is significantly short. Because the possibility that a frequency spectrum of the interference signal will be greatly changed in the short amount of time is low, the reception accuracy of the reception device 1 is not substantially degraded even when the reception device 1 is not provided with the delay section 15. On the other hand, it is possible to shorten processing time until the FEC decoding section 19 outputs reception data after the antenna 11 receives a signal by the reception device 1 not having the delay section 15.

Also, the interference information extraction process may be implemented by a method different from the interference information extraction process in the above-described embodiment. For example, the reception device 1 is further provided with an auxiliary antenna having directivity to receive an interference signal arriving from a direction of the interference source 3 whose location is identified, and the interference information extraction section 13 may extract interference information from an interference signal received by the auxiliary antenna. For example, the interference information extraction section 13 may extract interference information based on a frequency spectrum of a signal in which power is not allocated to a subcarrier transmitted from the transmission device 2 at a predetermined timing.

A configuration in which the reception device 1 is provided with the reception section 12 to perform analog/digital conversion on a reception signal has been described in the above-described embodiment, but the analog/digital conversion may not be performed on the reception signal.

A configuration in which the interference information extraction section 13 and the filter 16 process a reception signal down-converted and analog/digital converted by the reception section 12 has been described in the above-described embodiment, but the reception device 1 may be configured as shown in the following (1) to (3).

(1) The interference information extraction section 13 processes a reception signal down-converted and analog/digital-converted by the reception section 12, and the filter 16 receives and processes a reception signal before down-conversion and analog/digital conversion from the antenna 11. In this case, a reception section is provided between the filter 16 and the demodulation section 17. The reception section performs down-conversion and analog/digital conversion on the reception signal filtered by the filter 16.

(2) The interference information extraction section 13 receives and processes a reception signal before down-conversion and analog/digital conversion from the antenna 11, and the filter 16 processes the reception signal down-converted and analog/digital-converted by the reception section 12.

(3) The interference information extraction section 13 and the filter 16 receive and process a reception signal before down-conversion and analog/digital conversion from the antenna 11. In this case, a reception section is provided between the filter 16 and the demodulation section 17. The reception section performs down-conversion and analog/digital conversion on the reception signal filtered by the filter 16.

The embodiments of the present invention have been described in detail with reference to the drawings. However, specific configurations are not limited to the embodiments and may include any design in the scope without departing from the subject matter of the present invention.

INDUSTRIAL APPLICABILITY

The present invention is applicable to a communication device which performs wireless communication.

DESCRIPTION OF REFERENCE NUMERALS

1: Reception device
11: Antenna
12: Reception section (reception section)
13: Interference information extraction section (interference signal frequency position detection section)
14: Filter control section (filter section)
15: Delay section
16: Filter (filter section)
17: Demodulation section (guard interval removal section and subcarrier demodulation section)
18: Deinterleaver
19: FEC decoding section (error correction section)
2: Transmission device
3: Interference source
P1: Reception device
P101: Auxiliary antenna
P102: Interference signal extraction section
P103: Demodulation section
P104: Deinterleaver
P105: FEC decoding section
P106: FEC encoding section
P107: Interleaver
P108: Modulation section
P109: amplitude and phase control section
P110: Antenna
P111: Delay section
P112: Combining section
P113: Demodulation section
P114: Deinterleaver
P115: FEC decoding section

The invention claimed is:

1. A reception device comprising:
a reception section which receives a combined signal in which a multicarrier signal is combined with an interference signal via a radio transmission path;
an interference signal frequency position detection section which detects a frequency position of the interference signal in the combined signal;
a filter section which suppresses the combined signal at the detected frequency position of the interference signal;
a guard interval removal section which removes a guard interval from the combined signal suppressed by the filter section;
a subcarrier demodulation section which demodulates each subcarrier of the combined signal from which the guard interval is removed; and
an error correction section which performs error correction on the demodulated signal,
wherein the filter section suppresses at the detected frequency position of the interference signal of the combined signal which is received before a filtering target combined signal, and
a reception timing difference between a filtered combined signal and the combined signal in which the frequency position of the interference signal is detected is short enough that the possibility that a frequency spectrum of the interference signal is greatly changed.

2. A reception method comprising:
a reception step of receiving, by a reception device, a combined signal in which a multicarrier signal is combined with an interference signal via a radio transmission path;
an interference signal frequency position detection step of detecting, by the reception device, a frequency position of the interference signal in the combined signal;
a filtering step of suppressing, by the reception device, the combined signal at the detected frequency position of the interference signal;
a guard interval removal step of removing, by the reception device, a guard interval from the combined signal suppressed by the filtering step;
a subcarrier demodulation step of demodulating, by the reception device, each subcarrier of the combined signal from which the guard interval is removed; and
an error correction step of performing, by the reception device, error correction on the demodulated signal,
wherein the filtering step of suppressing suppresses at the detected frequency position of the interference signal of the combined signal which is received before a filtering target combined signal, and
a reception timing difference between a filtered combined signal and the combined signal in which the frequency position of the interference signal is detected is short enough that the possibility that a frequency spectrum of the interference signal is greatly changed.

* * * * *